UNITED STATES PATENT OFFICE.

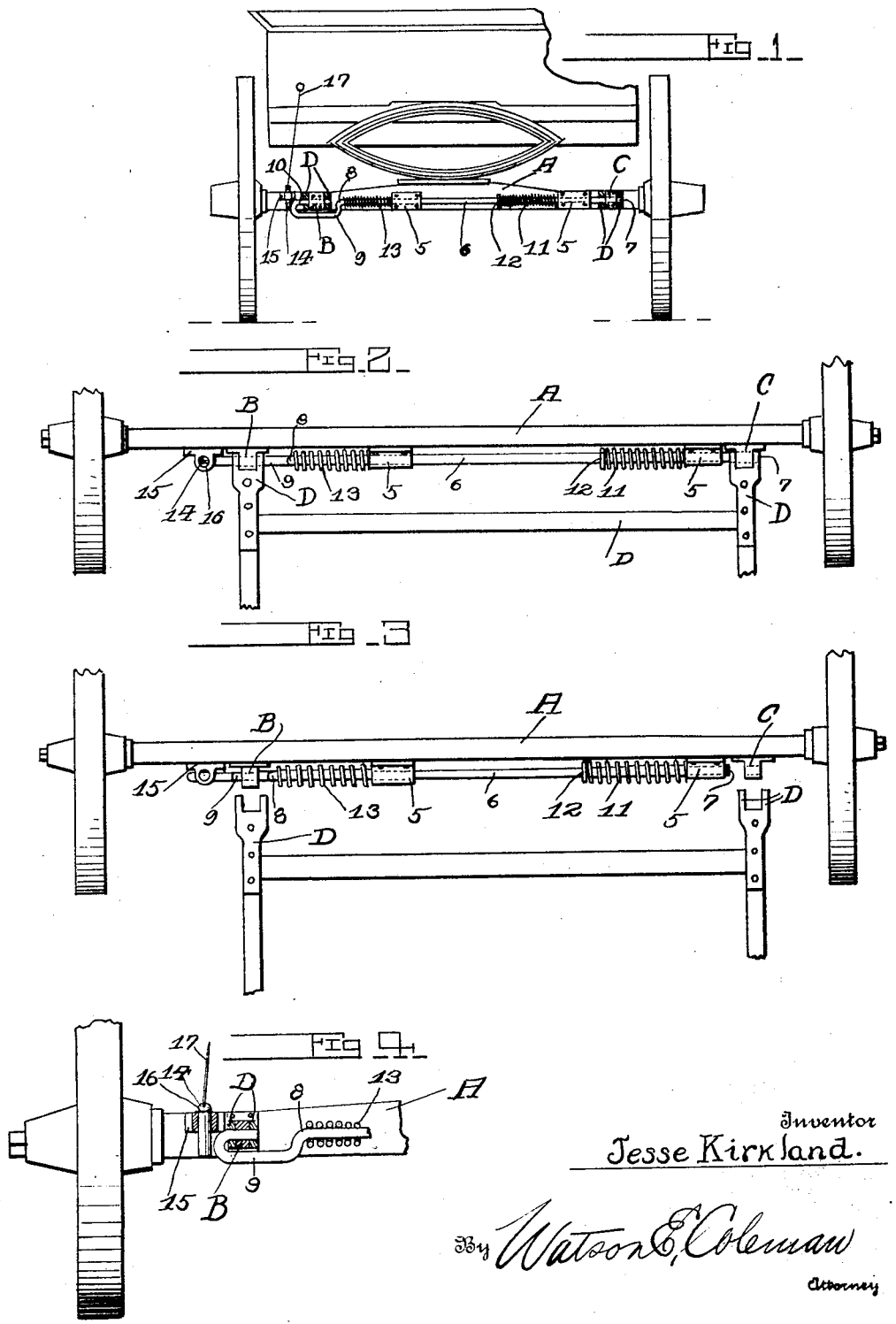

JESSE KIRKLAND, OF POVO, TENNESSEE.

HORSE-DETACHER.

1,386,005.  Specification of Letters Patent.  Patented Aug. 2, 1921.

Application filed September 27, 1920. Serial No. 413,003.

*To all whom it may concern:*

Be it known that I, JESSE KIRKLAND, a citizen of the United States, residing at Povo, in the county of Monroe and State of Tennessee, have invented certain new and useful Improvements in Horse-Detachers, of which the following is a specification, reference being had to the accompanying drawings.

This invention relates to horse detachers, and has for its object to provide a device of this character capable of being readily applied to the axle of a vehicle and easily operated to detach a horse and the shaft from the vehicle in cases of emergency.

Another object is to provide a device of this character wherein the detaching mechanism serves as the coupling pin of the shaft coupling, and wherein the shaft is operated automatically to simultaneously uncouple both ends of the shaft.

Another object of the invention is to provide a device of this character including a shaft which is journaled in an axle of the vehicle, the end portions of the shaft serving as the coupling pin, and a detaching pin mounted on the axle and adapted to hold the end portions of the shaft in the shaft couplings, said pin being readily removable to permit automatic uncoupling of the shafts or thills.

A still further object of the invention is to provide a device of this character wherein a single shaft is journaled on the front of the axle carrying the shafts of the vehicle, said shaft having its ends extending in the same direction so that movement of the shaft in one direction will simultaneously uncouple the shafts of the vehicle.

With these and other objects in view, the invention consists in the improved construction and arrangement of parts to be hereinafter more particularly described, fully claimed and illustrated in the accompanying drawings, in which:—

Figure 1 is a vertical elevation of a vehicle showing the invention applied, the ends of the thills or shafts being shown in section;

Fig. 2 is a top plan view of the structure shown in Fig. 1 and showing the thills coupled to the vehicle;

Fig. 3 is a top plan view showing the thills disconnected;

Fig. 4 is a fragmentary and sectional view showing the construction of one end of the operating shaft.

Referring to the drawings, A designates the front axle of a vehicle, said axle having the usual couplings or bearings B and C adapted to receive the ends of the thills or shafts D. Mounted on the front portion of the axle in spaced relation to each other is a pair of bearings 5, said bearings being adapted to receive a shaft 6.

The end portion 7 of the shaft is intended to be disposed in the coupling C, and serves as the pivot pin whereby the shafts D are coupled to the axle of vehicle. The end portion 8 of the shaft 6 is off-set, as at 9, said off-set portion extending under the bearing B and having its extremity extended back upon said off-set portion toward and in alinement with the shaft 6 to provide a pivot member 10. By the novel off-set arrangement of the end 8 of the shaft 6, both ends of the shaft extend in the same direction, so that movement of the shaft in one direction will simultaneously remove the pivot portions or ends of the shafts from the couplings B and C.

Surrounding the shaft 6 adjacent the end portion 7 is an expansion spring 11, one end of the spring being engaged with the inner end of the bearing of the shaft adjacent the end 7, while the other end is secured to the shaft by means of a collar 12. A spring 13 is disposed on the end portion 8 of the shaft, one end of said spring being engaged with the outer end of the bearing adjacent the end 8, while the other end of the spring is secured to the off-set portion 9 of the shaft. These springs are intended to move the shaft 6 longitudinally through the bearings 5 toward one end of the axle so as to disengage the ends of the shaft from the couplings. They are also powerful enough to instantly move the shaft when the latter is released so that in cases of emergency, the strength of the operator is not depended upon to detach the draft animal from the vehicle.

To prevent automatic operation of the shaft, when it is not desired to detach the shafts from the vehicle, I provide a novel detaching pin 14 which is slidably mounted in a bearing 15 carried by the axle adjacent the shaft coupling B. This pin is provided with a collar 16 which limits its movement through the bearing 15. One end of the pin is adapted to engage the end of the off-set portion 9 so as to hold the ends of the shaft within the couplings B and C. Secured to the upper end of the pin is an actuating member 17 which extends to the dashboard of the vehicle. This member may be either rigid or flexible and is intended to disengage the pin from the bearing 15.

In operation, in cases of emergency, such as a run-away, the member 17 is grasped so as to disengage the pin 16 from the axle, thereupon releasing the shaft 16 and permitting the springs 11 and 13 to expand and automatically shift the shaft longitudinally of the axle in one direction, causing the ends of the thills or shafts to leave the couplings B and C, thereby removing the pivot means of the shafts or thills and permitting the same to readily leave the axle. It is, of course, desirable that a vehicle using this detacher be provided with a brake so as to permit the vehicle to instantly stop when the horse is detached.

From the foregoing, it will be readily seen that this invention provides a novel, simple and compact form of horse detacher which, by the particular formation of the shafts 6, eliminates duplicate parts for uncoupling the shaft and at the same time permits the device to simultaneously uncouple both of the couplings. In addition to this, its construction permits it to be applied to the conventional form of axles without requiring alterations, and may be readily operated by the weak and strong alike, as the strength of the operator is not relied upon to uncouple the shafts, this being accomplished by the springs.

I claim:—

1. A device of the character described comprising a vehicle axle having shaft couplings, bearings on said axle, a shaft mounted in said bearings and having its end portions extending in the same direction and into the couplings, springs carried by the end portions of the shaft, each spring having one of its ends secured to the shaft, the other end of the spring being disposed in engagement with the adjacent bearing of the shaft for moving said shaft toward one end of the axle at certain times, and means carried by said axle to normally prevent said movement.

2. A device of the character described comprising a vehicle axle having shaft couplings, bearings on said axle, a shaft mounted in said bearings and having its end portions extending in the same direction and into the couplings, springs carried by the end portions of the shaft, each spring having one of its ends secured to the shaft, the other end of the spring being disposed in engagement with the adjacent bearing of the shaft for moving said shaft in one direction, a pin mounted on said axle and extending laterally thereof adjacent one end portion of the shaft, and actuating means connected to said pin, whereby the pin is disengaged from the axle to permit movement of the shaft through the medium of the springs.

3. In a horse detaching device, a vehicle axle, shaft couplings carried by said axle, bearings on said axle, a shaft slidably mounted in said bearings, one end portion of said shaft extending into one of the couplings, the opposite end portion of the shaft being off-set and having its extremity extended back upon said off-set portion toward and in alinement with the shaft and into the remaining shaft coupling, springs carried by the shaft and engaged with said bearings for urging the end portions of the shaft away from the shaft couplings, and a pin detachably mounted on the axle and adapted to engage the second mentioned end portion of the shaft to hold said end portions in the couplings against the tension of the springs.

4. A shaft detaching device embodying a vehicle axle, shaft couplings carried by the axle, a bearing carried by the axle adjacent one end thereof and one of the couplings, a second bearing carried by the axle adjacent its intermediate portion, a shaft slidably mounted in the bearings and having its ends arranged for movement in the same direction through the shaft couplings, springs carried by said shaft in spaced relation to the ends of the shaft, the inner end of one spring being secured to the shaft, the outer end of said spring being engaged with first mentioned bearing, the inner end of the remaining spring being engaged with the second mentioned bearing, the outer end of said last mentioned spring being secured to the shaft in spaced relation to the end of the shaft, said springs being arranged to urge the shaft in one direction through the medium of the bearings, and means carried by said axle to normally prevent movement of the shaft.

In testimony whereof I hereunto affix my signature.

JESSE KIRKLAND.